(12) United States Patent
Beall

(10) Patent No.: US 7,726,511 B2
(45) Date of Patent: Jun. 1, 2010

(54) REVERSE OSMOSIS FILTRATION SYSTEM STORAGE TANKS

(75) Inventor: Timothy A. Beall, Redondo Beach, CA (US)

(73) Assignee: Next-RO, Inc., Kernville, CA (US)

( * ) Notice: Subject to any disclaimer, the term of this patent is extended or adjusted under 35 U.S.C. 154(b) by 0 days.

(21) Appl. No.: 11/509,874

(22) Filed: Aug. 25, 2006

(65) Prior Publication Data
US 2007/0045327 A1    Mar. 1, 2007

Related U.S. Application Data

(60) Provisional application No. 60/711,649, filed on Aug. 26, 2005.

(51) Int. Cl.
*B65D 25/14* (2006.01)
*A47G 19/00* (2006.01)

(52) U.S. Cl. .................... 220/723; 220/23.86

(58) Field of Classification Search ........... 220/723, 220/721, 720, 530, 529, 495.04, 495.03, 220/495.01, 4.13, 4.12, 23.86, FOR. 116, 220/FOR. 115, FOR. 112, FOR. 172, FOR. 173; 138/30, 42, 43, 46; 210/257.2, 257.1; *F15B 1/047*
See application file for complete search history.

(56) References Cited

U.S. PATENT DOCUMENTS

| | | | | | |
|---|---|---|---|---|---|
| 2,299,611 | A | * | 10/1942 | Clark | 138/30 |
| 2,343,320 | A | | 3/1944 | Parker | |
| 2,349,321 | A | * | 5/1944 | White | 138/30 |
| 2,349,322 | A | * | 5/1944 | White | 138/30 |
| 2,360,590 | A | * | 10/1944 | Schweller | 138/30 |
| 2,380,866 | A | * | 7/1945 | Overbeke | 138/30 |
| 2,387,598 | A | * | 10/1945 | Mercier | 222/386.5 |
| 2,389,791 | A | * | 11/1945 | Lippincott | 138/30 |
| 2,389,792 | A | * | 11/1945 | Lippincott | 138/30 |
| 2,390,319 | A | * | 12/1945 | Overbeke | 138/30 |

(Continued)

FOREIGN PATENT DOCUMENTS

DE    3642882 A1 *   6/1988

(Continued)

OTHER PUBLICATIONS

"Supplementary European Search Report Dated Aug. 18, 2008" European Patent Application No. 06813876.7.

*Primary Examiner*—Anthony Stashick
*Assistant Examiner*—Robert J Hicks
(74) *Attorney, Agent, or Firm*—Blakely Sokoloff Taylor & Zafman LLP

(57) ABSTRACT

A reverse osmosis product water storage tank having first and second molded shells coupled together to form an enclosure, a bladder within the enclosure and coupled to separate product water from squeeze water within the enclosure, a first port through a wall of the enclosure to provide water access to the product water side of the bladder, a second port through a wall of the enclosure to provide squeeze water access to the squeeze water side of the bladder and wherein the inner surfaces of the enclosure having a topography configured to define a plurality of channels between the inner surfaces of the enclosure and the bladder when the bladder is full of product water for accommodating squeeze water flow into the enclosure between the enclosure and the bladder when the bladder is full of product water.

13 Claims, 4 Drawing Sheets

U.S. PATENT DOCUMENTS

| | | | |
|---|---|---|---|
| 2,394,401 A * | 2/1946 | Overbeke | 138/30 |
| 2,397,248 A * | 3/1946 | De Kiss | 138/30 |
| 2,794,570 A * | 6/1957 | Downs | 220/565 |
| 2,991,885 A | 7/1961 | Gutkowski | |
| 3,232,318 A * | 2/1966 | Mercier | 138/30 |
| 3,365,061 A * | 1/1968 | Bray | 210/130 |
| 3,406,722 A * | 10/1968 | Ruth | 138/30 |
| 3,493,496 A * | 2/1970 | Bray et al. | 210/116 |
| 3,504,796 A * | 4/1970 | Bray | 210/137 |
| 3,506,037 A * | 4/1970 | Urdea et al. | 138/30 |
| 3,520,437 A * | 7/1970 | Fleming et al. | 220/4.05 |
| 3,720,235 A * | 3/1973 | Schrock | 138/137 |
| 3,760,951 A | 9/1973 | Mansfield | |
| 3,844,744 A * | 10/1974 | Hausberg et al. | 96/253 |
| 4,176,063 A * | 11/1979 | Tyler | 210/101 |
| 4,181,235 A * | 1/1980 | Baysinger | 220/4.12 |
| 4,299,254 A * | 11/1981 | Zahid | 138/30 |
| D273,976 S * | 5/1984 | Burrows | D23/205 |
| D273,977 S * | 5/1984 | Burrows | D23/204 |
| D274,452 S * | 6/1984 | Burrows | D23/205 |
| 4,482,456 A * | 11/1984 | Grayson | 210/134 |
| 4,552,656 A * | 11/1985 | Solomon | 210/137 |
| 4,585,554 A | 4/1986 | Burrows | |
| 4,595,497 A | 6/1986 | Burrows | |
| 4,657,674 A | 4/1987 | Burrows | |
| 4,705,625 A | 11/1987 | Hart, Jr. | |
| 4,743,366 A | 5/1988 | Burrows | |
| 4,775,465 A | 10/1988 | Burrows | |
| 4,776,952 A | 10/1988 | Burrows | |
| 4,784,181 A * | 11/1988 | Hilverdink | 138/30 |
| 4,830,744 A | 5/1989 | Burrows | |
| 4,834,873 A | 5/1989 | Burrows | |
| 4,853,117 A | 8/1989 | Burrows | |
| 4,859,320 A | 8/1989 | Beall, Jr. | |
| 4,880,534 A | 11/1989 | Burrows | |
| 4,895,654 A | 1/1990 | Burrows | |
| 4,971,689 A | 11/1990 | Burrows | |
| 4,990,248 A | 2/1991 | Brown et al. | |
| 4,992,170 A | 2/1991 | Menon et al. | |
| 5,037,547 A | 8/1991 | Burrows | |
| 5,045,197 A | 9/1991 | Burrows | |
| 5,096,574 A * | 3/1992 | Birdsong et al. | 210/90 |
| 5,114,572 A | 5/1992 | Hunter et al. | |
| 5,132,017 A | 7/1992 | Birdsong et al. | |
| 5,192,004 A | 3/1993 | Burrows | |
| 5,221,473 A | 6/1993 | Burrows | |
| 5,246,141 A | 9/1993 | Burrows | |
| 5,254,243 A | 10/1993 | Carr et al. | |
| 5,289,951 A | 3/1994 | Burrows | |
| 5,297,700 A | 3/1994 | Burrows et al. | |
| 5,307,958 A | 5/1994 | Burrows | |
| 5,310,088 A | 5/1994 | Burrows | |
| 5,370,276 A | 12/1994 | Burrows | |
| 5,390,826 A | 2/1995 | Burrows | |
| 5,435,909 A | 7/1995 | Burrows | |
| 5,449,093 A | 9/1995 | Burrows | |
| 5,527,450 A | 6/1996 | Burrows | |
| 5,580,444 A | 12/1996 | Burrows | |
| 5,672,272 A * | 9/1997 | Baer | 210/231 |
| 5,766,453 A | 6/1998 | Morellato et al. | |
| 5,906,225 A * | 5/1999 | Stark et al. | 138/41 |
| 6,076,557 A * | 6/2000 | Carney | 138/30 |
| 6,099,735 A | 8/2000 | Kelada | |
| 6,110,360 A | 8/2000 | Hart, Jr. | |
| 6,290,856 B1 | 9/2001 | Beall | |
| 6,764,595 B1 | 7/2004 | Halemba et al. | |
| 7,070,695 B2 | 7/2006 | Husain et al. | |
| 7,216,673 B2 | 5/2007 | Gremour et al. | |
| 2004/0173624 A1* | 9/2004 | Carter | 220/720 |
| 2005/0139530 A1 | 6/2005 | Heiss | |
| 2005/0167352 A1 | 8/2005 | Burrows et al. | |
| 2006/0000839 A1* | 1/2006 | Gremour et al. | 220/721 |
| 2006/0113240 A1 | 6/2006 | Burrows et al. | |

FOREIGN PATENT DOCUMENTS

| | | |
|---|---|---|
| DE | 3706705 A1 * | 9/1988 |
| DE | 4444350 A1 | 6/1996 |
| GB | 2264684 A * | 9/1993 |
| JP | 54128014 A * | 10/1979 |
| JP | 01030901 A * | 2/1989 |
| SU | 386156 | 6/1973 |
| SU | 1089305 | 4/1984 |

* cited by examiner

REVERSE OSMOSIS FILTRATION SYSTEM STORAGE TANKS

CROSS-REFERENCE TO RELATED APPLICATION

This application claims the benefit of U.S. Provisional Patent Application No. 60/711,649 filed Aug. 26, 2005.

BACKGROUND OF THE INVENTION

1. Field of the Invention

The present invention relates to the field of reverse osmosis filtration systems.

2. Prior Art

Reverse osmosis water filtration systems pressurize one side of an appropriate membrane with source water, causing the water to slowly pass through the membrane, leaving impurities therein on the source water side of the membrane for flushing away by controlled flow of excess source water past the membrane. The filtered or product water passing through the membrane is accumulated in a storage tank having a flexible bladder separating the storage tank into a product water storage area and a squeeze water area. Normally when the product water storage tank area defined by the bladder is filled, the bladder lies flat against the tank wall. Now when the product water is to be dispensed, squeeze water is coupled to the region between the bladder and the tank wall. However, because the bladder is flat against the tank wall, it takes a moment for the squeeze water to seep between the bladder and the tank wall. Therefore there is an initial hesitation in squeeze water flow, and accordingly in product water pressurization, providing an undesired hesitation and uncertainty in the initial product water dispensing.

DETAILED DESCRIPTION OF THE PREFERRED EMBODIMENTS

Figure 1:
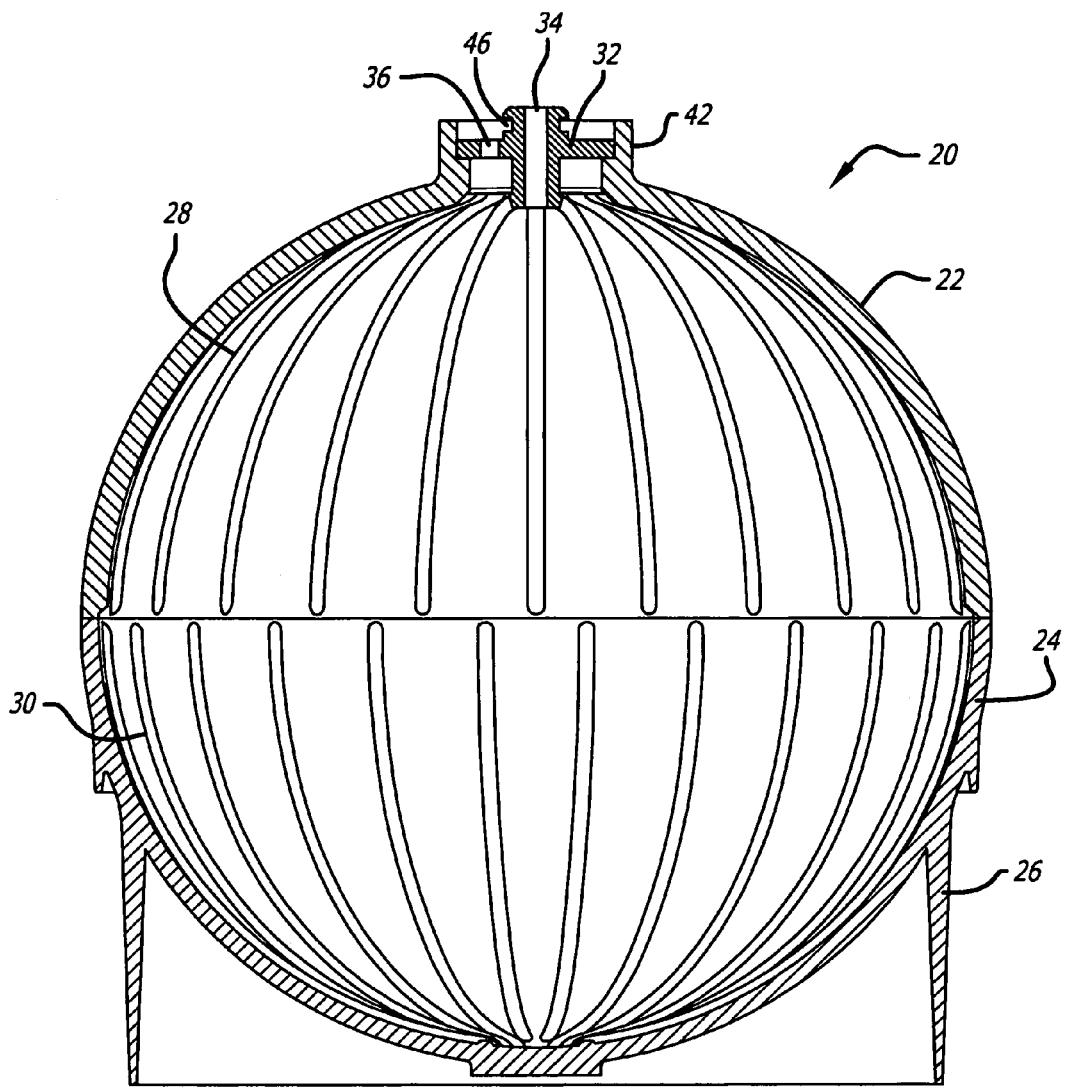
FIG. 1 is a cross section of a tank assembly in accordance with a preferred embodiment of the present invention.
Figure 2:
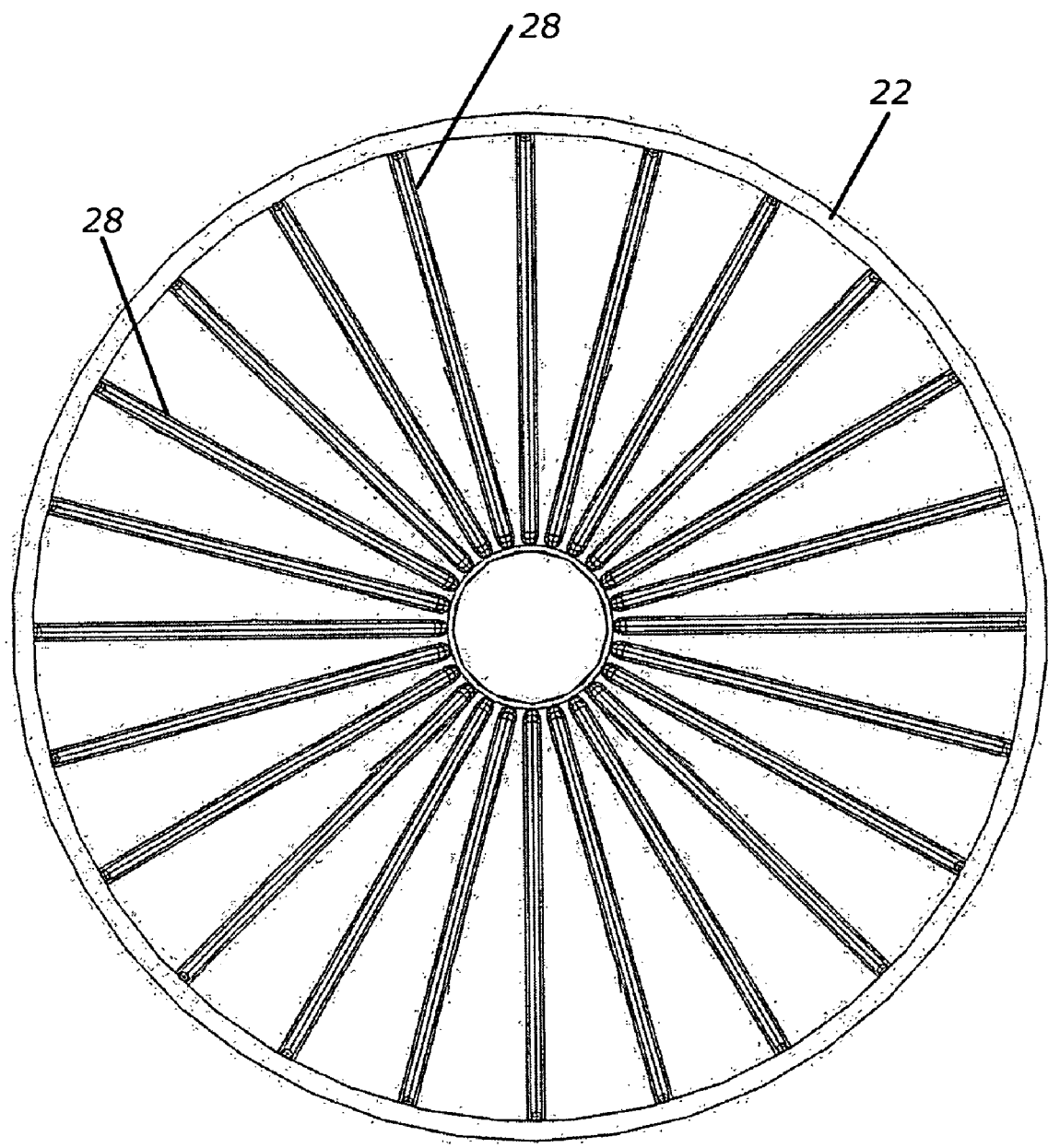
FIG. 2 is a view looking directly into the upper shell 22 of the embodiment of FIG. 1

Reverse osmosis filtration storage tanks having improved manufacturability and performance are disclosed. As may be seen in FIG. 1, the storage tanks 20 of the preferred embodiment are manufactured from upper and lower shells 22 and 24, with the lower shell 24 having a hollow circular base 26 for support of the finished tank 20 on a flat surface. FIG. 1, being a cross-section of the tank, shows the ribs or protrusions 28 and 30 in the upper and lower tank shells 22 and 24, respectively. These ribs are rib-like protrusions integrally molded on the inside surface of the tank shells, the function of which shall be subsequently described. FIG. 2 is a view looking into the upper shell 22 providing a face view of the ribs.

Also shown in FIG. 1 is a top member 32 providing a central opening 34 for product water into and out of a bladder that will be placed within the tank, and a plurality of peripheral openings 36 for squeeze water to selectively pressurize the product water for dispensing purposes. In the preferred embodiment, the two tank shells 22 and 24 are spin welded together to provide a strong and permanent joining of the two members to define a substantially spherical inner surface interrupted primarily by the ribs just described.

Figure 3:
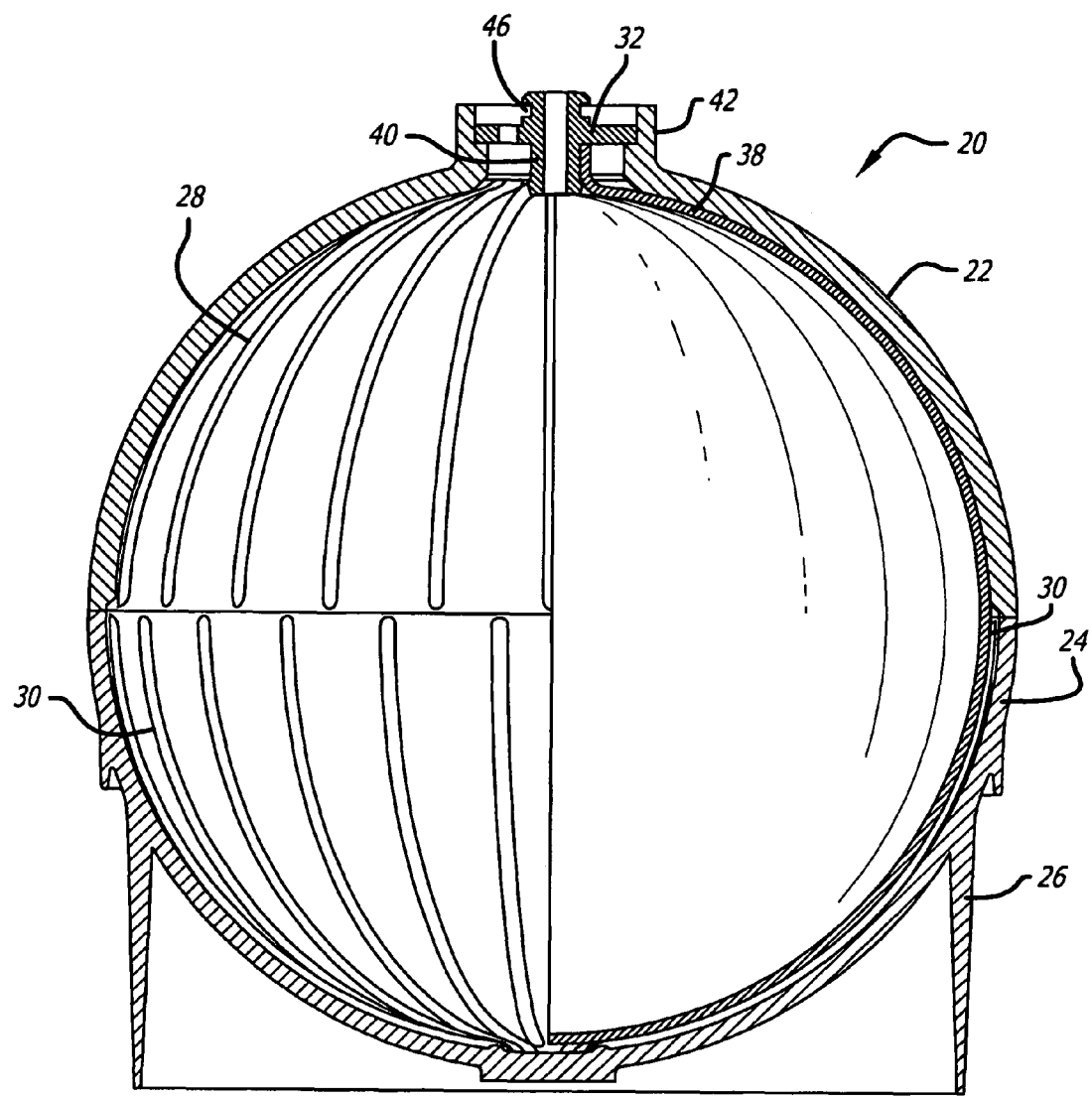
FIG. 3 is a cross section similar to that of FIG. 1, but with the bladder shown in the right side of the Figure.

Now referring to FIG. 3, the left side of the Figure shows the same cross-section as FIG. 1, with the right side of the Figure showing the cross-section of the tank after bladder 38 has been installed. Bladder 38 is preferably a spherical blow molded bladder of any flexible material conventionally used for reverse osmosis filtration storage tank bladders, and has a neck that fits over downward protrusion 40 of member 32 and is sealed with respect thereto. As may be seen in the lower part of FIG. 3, ribs 30 locally hold the bladder away from the wall of shell 24, with ribs 28 shown in FIG. 1 doing the same with respect to shell 22 at other positions around the inner periphery of the shell. In that regard, the relative angular orientation of the two shell 22 and 24 is not relevant, and need not be controlled.

Figure 4:
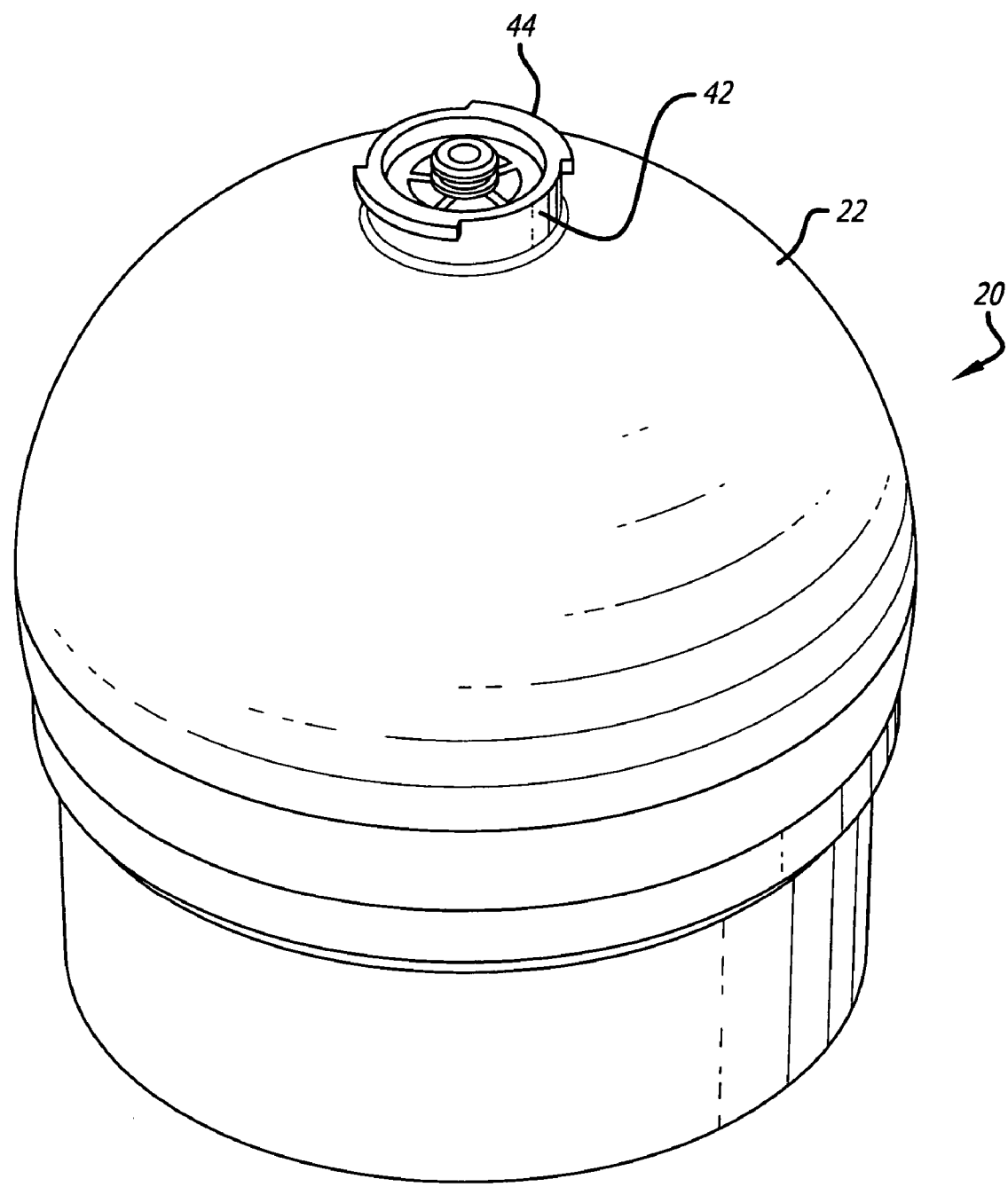
FIG. 4 is a perspective view of the final tank assembly of the preferred embodiment.

A perspective view of the finished assembly of the preferred embodiment may be seen in FIG. 4. As shown therein, in the preferred embodiment the top 42 of the upper shell 22 has a bayonet-type connector 44 which will fasten the top 42 of the tank to the rest of the reverse osmosis filtration system assembly, with an O-ring in O-ring groove 46 (see FIGS. 1 and 2) sealing the product water connection and an O-ring fitting within the inner periphery of the top 42 sealing against that inner periphery to prevent leakage against squeeze water, particularly when pressurized.

In operation, during filtration, the squeeze water region between the bladder 38 and the inner periphery of the tank 20 is vented to drain so that the product water passing through the reverse osmosis membrane will accumulate in the interior of the bladder. Thus the bladder will essentially inflate with product water, displacing most of the squeeze water out to drain. However the ribs 28 and 30 on the inner periphery of the tank hold the bladder locally away from the inner wall of the tank to leave flow passages through ports 36 to these regions around the ribs. Consequently when the bladder is full and the system shuts off, these flow passages at each side of the ribs will remain. Now when product water is called for, such as by the opening of a faucet or the turning on of an ice maker valve, and the system pressurizes the squeeze water, the squeeze water is free to flow into the region between the bladder 38 and the inner periphery of the tank, pressurizing the product water substantially immediately for dispensing purposes. Consequently, the tank of the present invention is easily injection molded and spin welded and has the further advantage of eliminating the hesitation and uncertainty in the initial dispensing of product water from a full storage tank.

In the preferred embodiment, ribs are disposed on the interior surface of the tank to define flow paths for the initial inflow of squeeze water. Alternatively, similar depressions could be used in the tank wall, but are not preferred, as they weaken the tank, requiring a somewhat thicker average wall thickness for the tank, adding expense. As further alternatives, however, the ribs do not need to run throughout the inners surfaces of the tank, or be circumferentially oriented, but at least should emanate from the squeeze water connection to the tank. Each "rib" also could be in the form of two raised areas adjacent each other, thereby defining another squeeze water flow path between the raised areas. Similarly, the tank shells may define an interior other than spherical, and/or may be assembled other than by spin welding, though spin welding is preferred as providing a very inexpensive manufacturing technique that provides a weld strength substantially as strong as the molded material itself.

Thus while certain preferred embodiments of the present invention have been disclosed and described herein for purposes of illustration and not for purposes of limitation, it will be understood by those skilled in the art that various changes in form and detail may be made therein without departing from the spirit and scope of the invention.

What is claimed is:

1. A reverse osmosis product water storage tank comprising:
   first and second molded shells coupled together to form an enclosure;
   a bladder within the enclosure and coupled to separate product water from squeeze water within the enclosure;
   a first port through a wall of the enclosure to provide water access to the product water side of the bladder;
   a second port through a wall of the enclosure to provide squeeze water access to the squeeze water side of the bladder;
   inner surfaces of the enclosure having a plurality of protrusions integrally molded to the inner surfaces of the first and second molded shells to protrude from the inner surfaces toward the bladder and emanating from the second port to hold said bladder only locally away from said inner surfaces when the bladder is full of product water for accommodating squeeze water flow into the enclosure between the enclosure and the bladder.

2. The tank of claim 1 wherein the first and second molded shells define a substantially spherical enclosure.

3. The tank of claim 2 wherein the first and second molded shells are welded together.

4. The tank of claim 1 wherein the first and second ports are concentric ports.

5. The tank of claim 1 wherein the first molded shell has an opening with an insert therein defining a central first port for product water and at least one second port adjacent the central first port for squeeze water, the bladder being coupled to the central first port.

6. The tank of claim 1 wherein the plurality of protrusions emanate from the vicinity of the second port.

7. A reverse osmosis product water storage tank comprising:
   first and second molded shells coupled together in a plane to form an enclosure, the shells having a common axis perpendicular to the plane;
   a bladder within the enclosure and coupled to separate product water from squeeze water;
   an opening in the first molded shell substantially on its axis with an insert therein defining a central conduit for product water and at least one passage adjacent the central conduit for squeeze water, the bladder being coupled to the central conduit;
   inner surfaces of the enclosure having a plurality of protrusions integrally molded to the inner surfaces of the first and second molded shells to protrude from the inner surfaces toward the bladder and emanating from the second port to hold said bladder only locally away from said inner surfaces when the bladder is full of product water for accommodating squeeze water flow into the enclosure between the enclosure and the bladder.

8. The tank of claim 7 wherein the first and second molded shells define a substantially spherical enclosure.

9. The tank of claim 7 wherein the first and second molded shells are spin welded together.

10. The tank of claim 7 wherein the plurality of protrusions emanate from the vicinity of the opening in the first molded shell.

11. A reverse osmosis product water storage tank comprising:
    first and second molded shells welded together in a plane to form a spherical enclosure, the shells having a common axis perpendicular to the plane;
    a bladder within the enclosure and coupled to separate product water from squeeze water;
    an opening in the first molded shell substantially on its axis with an insert therein defining a central conduit for product water and at least one passage adjacent the central conduit for squeeze water, the bladder being coupled to the central conduit;
    inner surfaces of the enclosure having a plurality of protrusions integrally molded to the inner surfaces of the first and second molded shells to protrude from the inner surfaces toward the bladder and emanating from the second port to hold said bladder only locally away from said inner surfaces when the bladder is full of product water for accommodating squeeze water flow into the enclosure between the enclosure and the bladder.

12. The tank of claim 11 wherein the plurality of protrusions emanate from the vicinity of the opening in the first molded shell.

13. A reverse osmosis product water storage tank comprising:
    first and second molded shells spin welded together in a plane to form a spherical enclosure, the shells having a common axis perpendicular to the plane;
    a bladder within the enclosure and coupled to separate product water from squeeze water;
    an opening in the first molded shell substantially on its axis with an insert therein defining a central conduit for product water and at least one passage adjacent the central conduit for squeeze water, the bladder being coupled to the central conduit;
    inner surfaces of the enclosure having a plurality of protrusions to protrude from the inner surfaces toward the bladder and emanating from the second port to hold said bladder only locally away from said inner surfaces when the bladder is full of product water for accommodating squeeze water flow into the enclosure between the enclosure and the bladder.

* * * * *